(12) United States Patent
Jiang

(10) Patent No.: US 9,197,000 B2
(45) Date of Patent: Nov. 24, 2015

(54) SIM CARD HOLDER, MOBILE TERMINAL AND METHOD FOR IDENTIFYING HOTPLUG OF SIM CARD

(75) Inventor: Zhuojiao Jiang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/402,368

(22) PCT Filed: Jul. 26, 2012

(86) PCT No.: PCT/CN2012/079214
§ 371 (c)(1),
(2), (4) Date: Nov. 20, 2014

(87) PCT Pub. No.: WO2013/174077
PCT Pub. Date: Nov. 28, 2013

(65) Prior Publication Data
US 2015/0111413 A1    Apr. 23, 2015

(30) Foreign Application Priority Data
May 23, 2012    (CN) .......................... 2012 1 0161443

(51) Int. Cl.
*H01R 13/62*    (2006.01)
*H01R 13/506*    (2006.01)
(Continued)

(52) U.S. Cl.
CPC ............ *H01R 13/506* (2013.01); *G06K 7/0069* (2013.01); *H04M 1/026* (2013.01); *H01R 12/7094* (2013.01)

(58) Field of Classification Search
CPC . H01R 13/506; H01R 12/7094; H04M 1/026; G06K 7/0069
USPC ........................................................ 439/370
See application file for complete search history.

(56) References Cited

U.S. PATENT DOCUMENTS 8,041,342 B2    10/2011    Chang
8,337,223 B2    12/2012    Gao
(Continued)

FOREIGN PATENT DOCUMENTS

CN    201008171 Y    1/2008
CN    101262642 A    9/2008
(Continued)

OTHER PUBLICATIONS

International Search Report in international application No. PCT/CN2012/079214, mailed on Mar. 7, 2013.
(Continued)

*Primary Examiner* — Jean F Duverne
(74) *Attorney, Agent, or Firm* — Oppedahl Patent Law Firm LLC; Carl Oppedahl; Micah Gunn

(57) ABSTRACT

The disclosure provides a subscriber identity module (SIM) card holder, a base of the SIM card holder is provided with SIM card metallic contacts and first fixed metallic pins connected with the metallic contacts; the base of the SIM card holder is further provided with an additional metallic dome; the additional metallic dome is in uncompressed state and in contact with high level when the SIM card is not plugged in the SIM card holder, and is in compressed state and in contact with low level when the SIM card is plugged in the SIM card holder, delivering the high/low level with which it is in contact to a master chip of a mobile terminal to identify the plug-in and pull-out of the SIM card. The disclosure further comprises a mobile terminal and a method of identification of the hot-plug of a SIM card. With the help of the disclosure, problems of complex design, occupation of motherboard space, increased product cost in existing cell phones with hot-plug of SIM cards may be solved.

23 Claims, 2 Drawing Sheets

(51) Int. Cl.
*G06K 7/00* (2006.01)
*H04M 1/02* (2006.01)
*H01R 12/70* (2011.01)

(56) References Cited

U.S. PATENT DOCUMENTS

| | | | |
|---|---|---|---|
| 8,608,494 B2* | 12/2013 | Yang | H01R 12/7094 439/159 |
| 8,968,029 B2* | 3/2015 | Yun | H01R 12/714 439/159 |
| 9,083,438 B2* | 7/2015 | Tsai | G06K 7/0069 |
| 2001/0014549 A1 | 8/2001 | Martucci | |
| 2004/0023538 A1 | 2/2004 | Masson | |
| 2005/0264622 A1* | 12/2005 | Silverbrook | B41J 2/17546 347/86 |
| 2006/0250490 A1* | 11/2006 | Silverbrook | B41J 29/38 347/109 |
| 2006/0251458 A1* | 11/2006 | Silverbrook | B41J 3/36 400/88 |
| 2008/0220745 A1 | 9/2008 | Chang | |
| 2009/0163245 A1 | 6/2009 | Oozeki | |
| 2012/0083145 A1 | 4/2012 | Gao | |
| 2012/0083316 A1 | 4/2012 | Lee | |

FOREIGN PATENT DOCUMENTS

| | | |
|---|---|---|
| CN | 201174246 Y | 12/2008 |
| CN | 102448049 A | 5/2012 |
| EP | 0889493 A2 | 1/1999 |
| EP | 1924067 A1 | 5/2008 |

OTHER PUBLICATIONS

English Translation of the Written Opinion of the International Search Authority in international application No. PCT/CN2012/079214, mailed on Mar. 7, 2013.
Supplementary European Search Report in European application No. 12877459.3, mailed on Apr. 9, 2015.

* cited by examiner

SIM CARD HOLDER, MOBILE TERMINAL AND METHOD FOR IDENTIFYING HOTPLUG OF SIM CARD

TECHNICAL FIELD

The disclosure relates to the field of mobile communication equipment, and particularly to a SIM card holder, a mobile terminal and a method of identification of hot-plug of a SIM card.

BACKGROUND

With the fast development of communication network, cell phones have been indispensible electronic products in daily life, they are required to have a smaller size but more functions; meanwhile, the requirement for a Subscriber Identity Module (SIM) card becomes higher. A cell phone is not only equipped with a SIM card and a Micro SD card, but also has a much higher requirement for the hot plug. Furthermore, the popularity of Micro SD card brings urgent need for the hot-plug function of the Micro SD card.

At present, various cell phones with the hot-plug function of SIM card are present in the market, which initially solve the problem that shutdown is necessary during the change of SIM card. However, for ordinary cell phones with hot-plug function, the plug-in and pull-out states of the SIM card are monitored by an electronic switch, and then corresponding handling is performed by a master chip. This design is not only complex but also occupies the space of a motherboard, which increases the product cost and, at the same time, goes against the development tendency that cell phones become smaller and smaller.

SUMMARY

The embodiments of the disclosure provides a SIM card holder, a mobile terminal and a method of identification of the hot-plug of a SIM card for solving problems of complex design, occupation of motherboard space and increased product cost for existing cell phones with hot-plug of a SIM card.

Based on the problems described above, the embodiments of the disclosure provide a SIM card holder, the base of the SIM card holder is provided with SIM card metallic contacts and first fixed metallic pins connected with the metallic contacts, the base of the SIM card holder is further provided with an additional metallic dome; wherein in order to identify the plug-in and pull-out of the SIM card, the additional metallic dome is in an uncompressed state and in contact with high level when the SIM card is not plugged in the SIM card holder, and is in a compressed state and in contact with low level when the SIM card is plugged in the SIM card holder, furthermore the additional metallic domes delivers the high/low level with which it is in contact to a master chip of a mobile terminal.

In the solution described above, the base of the SIM card holder further includes a second fixed metallic pin for connecting with the additional metallic dome; accordingly, the additional metallic dome is further for connecting with a preset high level interface of the mobile terminal via the second fixed metallic pin when the SIM card is not plugged in the SIM card holder.

In the solution described above, the preset high level interface of the mobile terminal is a general purpose input/output (GPIO) interface of the master chip of the mobile terminal.

In the solution described above, the additional metallic dome is specifically for being in a compressed state and in contact with a preset low level motherboard zone exposed beneath the additional metallic dome under the compression of the SIM card when the SIM card is plugged in the SIM card holder.

In the solution described above, the base of the SIM card holder is provided with a hole under the additional metallic dome; the hole corresponds to the preset low level motherboard zone, the additional metallic dome under the compression of the SIM card is contacted with the preset low level motherboard zone via the hole.

In the solution described above, the additional metallic dome is adjacent to a ground pin of the metallic contacts, the additional metallic dome is in a compressed state and in contact with the ground pin in the metallic contacts under the compression of the SIM card when the SIM card is plugged in the SIM card holder.

In the solution described above, the SIM card holder further includes a metallic casing engaged with the base of the SIM card holder; the metallic casing includes a case body, a metallic pin and a snap joint provided on a side of the metallic casing.

The embodiments of the disclosure further provide a mobile terminal, including the master chip and the SIM card holder described above.

The embodiments of the disclosure further provide a method of identification of the hot-plug of a SIM card, including that:

a master chip of a mobile terminal monitors the variation in voltage level of an additional metallic dome of the base of a SIM card holder, the SIM card holder is in an uncompressed state and in contact with high level when the SIM card is not plugged in the SIM card holder, and in a compressed state and in contact with low level when the SIM card is plugged in the SIM card holder, and delivers its own high/low level to the master chip of the mobile terminal;

when the additional metallic dome is converted from high level to low level, the master chip of the mobile terminal determines that the SIM card is plugged in the SIM card holder;

when the additional metallic dome is converted from low level to high level, the master chip of the mobile terminal determines that the SIM card is pulled out from the SIM card holder.

The benefits of the embodiments of the disclosure include that:

the problem of hot-plug of a SIM card is solved mechanically by changing the structure of the SIM card holder by adding an additional metallic dome to the base of the SIM card holder. The additional metallic dome is in a uncompressed state and in contact with high level when the SIM card is not plugged in the SIM card holder, and is in a compressed state and in contact with low level when the SIM card is plugged in the SIM card holder, and delivers the high/low level with which it is in contact to a master chip of a mobile terminal to identify the plug-in and pull-out of the SIM card, so as to realize simple identification of the hot-plug of the SIM card. Moreover, the embodiments of the disclosure makes only slight modification to the existing SIM card holder without adding any new components, thus they will not increase the layout space of the motherboard of a cell phone and product cost, they are simple and useful, and are suitable for the SIM card holder of any mobile terminal.

DETAILED DESCRIPTION

Implementations of a SIM card holder, a mobile terminal and a method of identification of the hot plug of a SIM card provided in embodiments of the disclosure are described below, in combination with accompanied drawings.

A SIM card holder provided in embodiments of the disclosure is similar to an existing SIM card holder in that SIM card metallic contacts and first fixed metallic pins connected thereto are arranged on the base of the holder. The embodiment of the disclosure further improves the structure of the existing SIM card holder by adding an additional metallic dome on the base of the SIM card holder, wherein the additional metallic dome is in an uncompressed state and in contact with high level when no SIM card is plugged in the base and is in a compressed state and in contact with low level when the SIM card is plugged in the SIM card holder the base, and furthermore delivers the high/low level with which it is in contact to the master chip of a mobile terminal, enabling the master chip of the mobile terminal to identify the plug-in and pull-out of the SIM card.

In order to better describe the structure of the SIM card holder described above provided in embodiments of the disclosure, there is the illustration by the way of two specific embodiments.

First Embodiment

Figure 1:
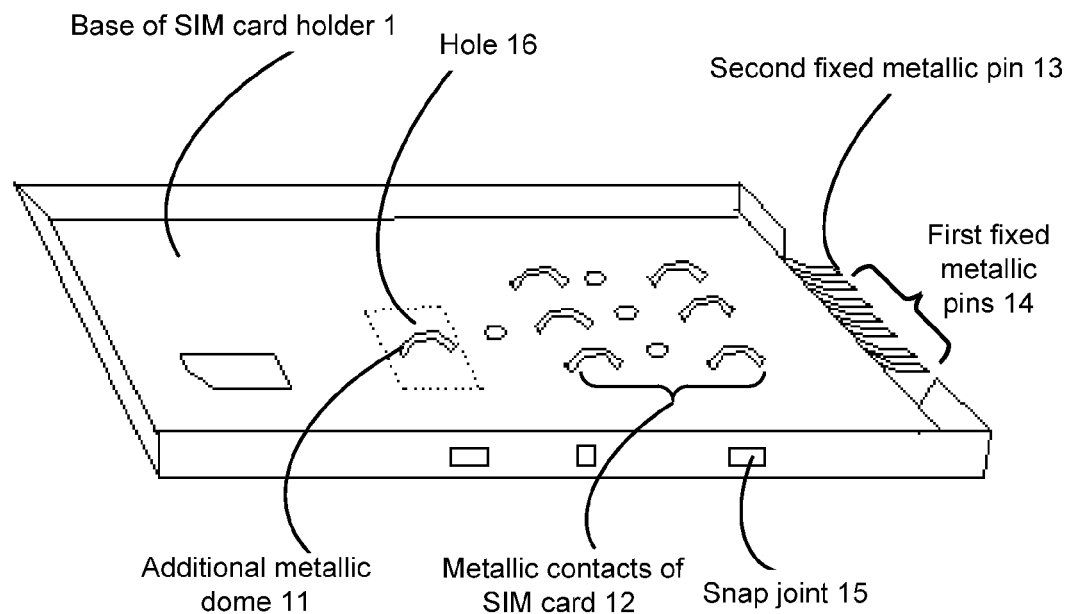
FIG. 1 is a structural diagram of a base of a SIM card holder provided in a first embodiment of the disclosure.

As shown in FIG. 1, the base of the SIM card holder according the first embodiment of the disclosure specifically includes an additional metallic dome 11, a metallic contacts 12 of the SIM card, a second fixed metallic pin 13, first fixed metallic pins 14, a corresponding snap joint 15 on a side face of the base and a hole 16 beneath the additional metallic dome.

In the first embodiment, the additional metallic dome 11 is connected to the second fixed metallic pin 13 and the second fixed metallic pin 13 is connected to a preset high level interface of the mobile terminal. Specifically, the second fixed metallic pin 13 may be connected to the GPIO interface of the master chip via routings on the Printed Circuit Board (PCB), wherein the master chip is taken as an interface with high level by default. In the first embodiment, the additional metallic dome 11 may further be connected to other preset high level interface via the second fixed metallic pin 13, which are not illustrated here. Thus, the additional metallic dome remains at high level when it is not deformed (i.e. the SIM card is not plugged in the SIM card holder to compress this additional metallic dome).

At the same time, this additional metallic dome 11 may further be implemented to be in a compressed state and in contact with an exposed motherboard zone with a preset low level under the additional metallic dome 11 when the SIM card is plugged in the SIM card holder. To realize this point, preferentially, the base of SIM card holder are arranged with a hole 16 under the additional metallic dome 11, which is as shown in FIG. 1, wherein the hole 16 is positioned corresponding to the motherboard zone preset with low level. Thus, the additional metallic dome 11 is, under the compression of the SIM card, connected via the hole 16 with the motherboard preset with low level.

In the structure described above, the additional metallic dome 11 contacts and remains at high level when the SIM card is not plugged in the SIM card holder, and contacts with low level and turns from high level to low level under the compression of a SIM card after the SIM card is plugged in the SIM card holder. The master chip may identify the insertion of a SIM card as soon as it detects a change from high level to low level of the additional metallic dome 11; on the contrary, if the additional metallic dome 11 described above gets back into shape, i.e. the contact with the motherboard zone at low level is stopped, the master chip will detects a recovery of the SIM card from low lever to high level, thus identifies the pull-out of the SIM card.

Figure 3:
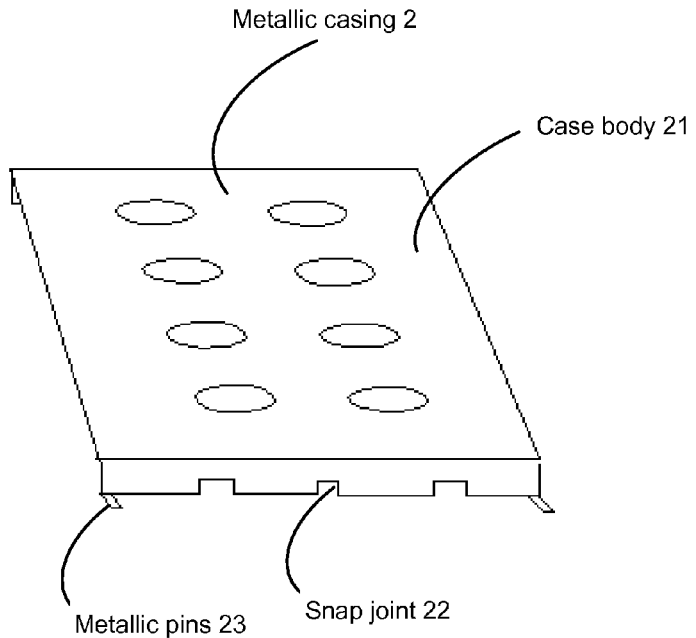
FIG. 3 is a structural diagram of a metallic casing of a SIM card holder provided in the disclosure.

Further as shown in FIG. 3, the SIM card holder in the first embodiment of the disclosure also includes a metallic casing 2 engaged with the base, the metallic casing including a case body 21, metallic pins 23 and snap joint 22 arranged at a side face of the metallic casing. The specific structure is the same with that in prior art and not repeated here.

Second Embodiment

Figure 2:
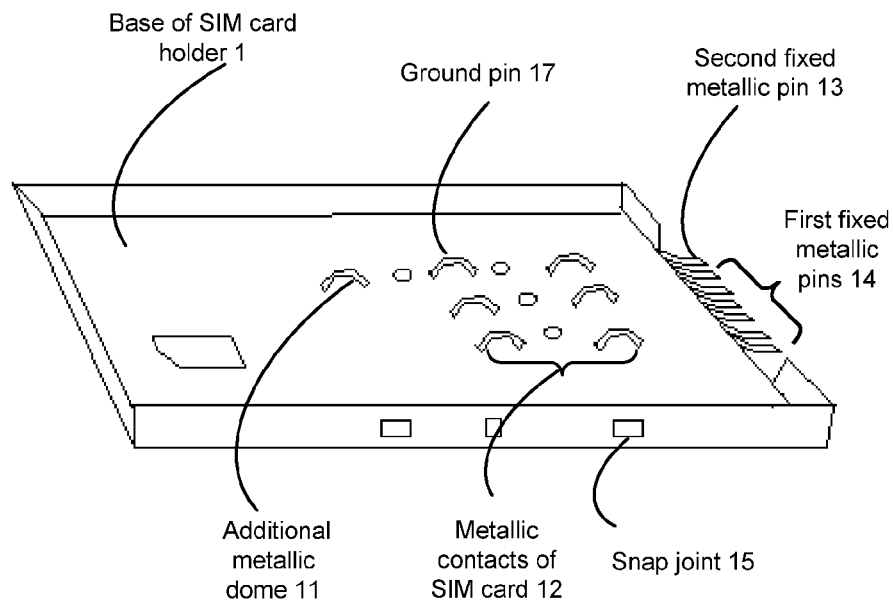
FIG. 2 is a structural diagram of a base of a SIM card holder provided in a second embodiment of the disclosure.

This embodiment has similar principle and structure with the first embodiment. As shown in FIG. 2, the base of the SIM card holder is additionally provided with an additional metallic dome 11 and a second fixed metallic pin 13 with respect to the structure of the existing SIM card holder. This embodiment differs from the first embodiment in that the additional metallic dome 11 is implemented to be contacted with low level in a compressed state in another way. Specifically, this additional metallic dome 11 is arranged in the base of the SIM card holder and is adjacent to a ground pin 17 in the metallic contacts. When the SIM card is plugged in the SIM card holder, the additional metallic dome 11, the additional metallic dome 11 is in a compressed state under the compression of the SIM card and is connected with the ground pin 17 in metallic contacts 12 of the SIM card.

But in the case where the additional metallic dome 11 is not compressed by the SIM card, the connection relationship is the same as that in the first embodiment. Thus the second embodiment may also identify the plug-in or pull-out of the SIM card by variation between high level and low level of the additional metallic dome 11.

Further, the second embodiment also includes a metallic casing 2 engaged with the base of the SIM card holder as shown in FIG. 3, which has been illustrated in the previous embodiment and not repeatedly described here.

The disclosure further provides a mobile terminal, including the SIM card holder and the master chip according to the embodiments of the disclosure, the specific structure of which has been illustrated in detail in the above-mentioned description of the structure and connection relation of SIM card holder and master chip and will not be repeatedly described here.

Figure 4:
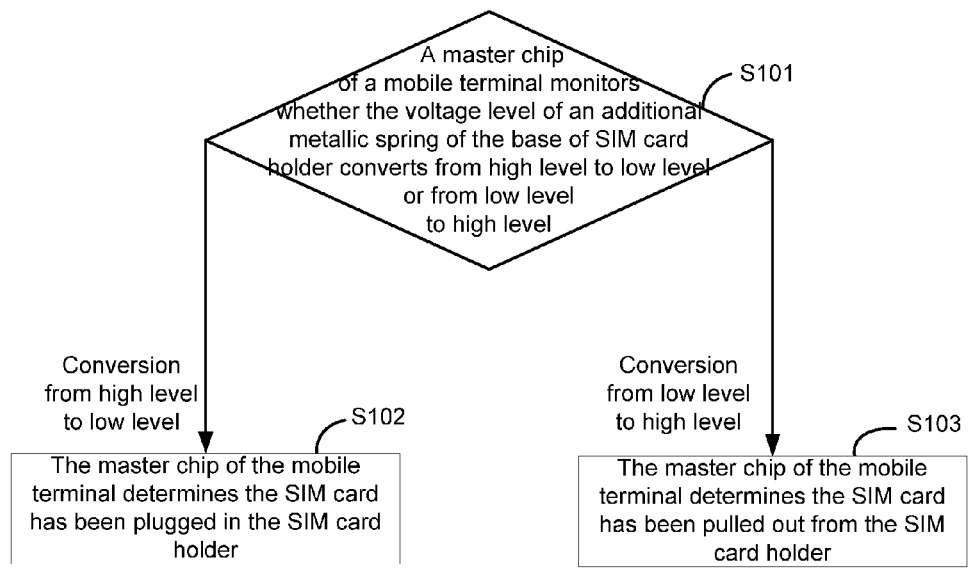
FIG. 4 is a flowchart of a method of identification of hot plug of a SIM card provided in an embodiment of the disclosure.

The embodiments of the disclosure, based on the same inventive concept, further provides a method of identification of the hot-plug of a SIM card, as shown in FIG. 4, which includes:

Step S101: a master chip of a mobile terminal monitors whether the voltage level of an additional metallic dome of the base of the SIM card holder is converted from high level to low level or from low level to high level, then step S102 is executed in the former case and step S103 is executed in the latter case;

here, the additional metallic dome is used to be in an uncompressed state and in contact with high level when the SIM card is not plugged in the SIM card holder, and otherwise in a compressed state and in contact with low level when the SIM card is plugged in the SIM card holder, furthermore to deliver its own high/low level to the master chip of the mobile terminal;

Step S102: the master chip of the mobile terminal determines the SIM card has been plugged in the SIM card holder and the handling process is terminated;

Step S103: the master chip of the mobile terminal determines the SIM card has been pulled out from the SIM card holder.

Through the description according to above embodiments, those skilled in the art may understand clearly that the embodiments of the disclosure may be implemented by hardware. By way of adding an extra additional metallic dome in the base, the extra additional metallic dome may implements the monitoring of the plug-in situation of the SIM card by the master chip side by different connection methods, and is adapted for the SIM card holder of any cell phone to carry out the hot-plug function of a SIM card mechanically without adding extra components.

Those skilled in the art may understand that accompanied drawings are just schematic diagrams of preferable embodiments, in which the components are not necessary for implementing the disclosure.

Obviously, those skilled in the art may achieve various modifications and variations of the disclosure without departing from the spirit and scope of the disclosure. Thus, if these modifications and variations of the disclosure are not beyond the scope of the claims of the disclosure and its equivalent technology, the disclosure is intended to contain these modifications and variations.

What is claimed is:

1. A subscriber identity module (SIM) card holder, comprising a base which is provided with metallic contacts of a SIM card and first fixed metallic pins connected with the metallic contacts, wherein the base of the SIM card holder is further provided with an additional metallic dome; wherein
the additional metallic dome is configured to be in an uncompressed state and in contact with high level when the SIM card is not plugged in the SIM card holder, and to be in a compressed state and in contact with low level when the SIM card is plugged in the SIM card holder, and to deliver the high/low level with which the additional metallic dome is in contact to a master chip of a mobile terminal where the additional metallic dome is arranged to identify plug-in and pull-out of the SIM card.

2. The SIM card holder according to claim 1, wherein the base of the SIM card holder further comprises a second fixed metallic pin configured to connect with the additional metallic dome;
accordingly, the additional metallic dome is further configured to connect with a preset high level interface of the mobile terminal via the second fixed metallic pin when the SIM card is not plugged in the SIM card holder.

3. The SIM card holder according to claim 2, wherein the preset high level interface of the mobile terminal is a general purpose input/output GPIO interface of the master chip of the mobile terminal.

4. The SIM card holder according to claim 1, wherein the additional metallic dome is configured to be in a compressed state and in contact with a preset low level motherboard zone exposed beneath the additional metallic dome under the compression of the SIM card when the SIM card is plugged in the SIM card holder.

5. The SIM card holder according to claim 4, wherein the base of the SIM card holder is provided with a hole under the additional metallic dome, the hole is positioned corresponding to the preset low level motherboard zone, and the additional metallic dome under the compression of the SIM card is contacted with the preset low level motherboard zone via the hole.

6. The SIM card holder according to claim 1, wherein the additional metallic dome is in adjacent to a ground pin of the metallic contacts, the additional metallic dome is in a compressed state and in contact with the ground pin in the metallic contacts under the compression of the SIM card when the SIM card is plugged in the SIM card holder.

7. The SIM card holder according to claim 1, wherein the SIM card holder further comprises a metallic casing engaged with the base of the SIM card holder; the metallic casing comprises a case body, a metallic pin and a snap joint provided on a side of the metallic casing.

8. A mobile terminal comprising the subscriber identity module (SIM) card holder and the master chip according to claim 1.

9. The SIM card holder according to claim 2, wherein the additional metallic dome is configured to be in a compressed state and in contact with a preset low level motherboard zone exposed beneath the additional metallic dome under the compression of the SIM card when the SIM card is plugged in the SIM card holder.

10. The SIM card holder according to claim 3, wherein the additional metallic dome is configured to be in a compressed state and in contact with a preset low level motherboard zone exposed beneath the additional metallic dome under the compression of the SIM card when the SIM card is plugged in the SIM card holder.

11. The SIM card holder according to claim 9, wherein the base of the SIM card holder is provided with a hole under the additional metallic dome, the hole is positioned corresponding to the preset low level motherboard zone, and the additional metallic dome under the compression of the SIM card is contacted with the preset low level motherboard zone via the hole.

12. The SIM card holder according to claim 10, wherein the base of the SIM card holder is provided with a hole under the additional metallic dome, the hole is positioned corresponding to the preset low level motherboard zone, and the additional metallic dome under the compression of the SIM card is contacted with the preset low level motherboard zone via the hole.

13. The SIM card holder according to claim 2, wherein the additional metallic dome is in adjacent to a ground pin of the metallic contacts, the additional metallic dome is in a compressed state and in contact with the ground pin in the metallic contacts under the compression of the SIM card when the SIM card is plugged in the SIM card holder.

14. The SIM card holder according to claim 3, wherein the additional metallic dome is in adjacent to a ground pin of the metallic contacts, the additional metallic dome is in a compressed state and in contact with the ground pin in the metallic contacts under the compression of the SIM card when the SIM card is plugged in the SIM card holder.

15. The SIM card holder according to claim 2, wherein the SIM card holder further comprises a metallic casing engaged with the base of the SIM card holder; the metallic casing comprises a case body, a metallic pin and a snap joint provided on a side of the metallic casing.

16. The SIM card holder according to claim 3, wherein the SIM card holder further comprises a metallic casing engaged with the base of the SIM card holder; the metallic casing comprises a case body, a metallic pin and a snap joint provided on a side of the metallic casing.

17. A mobile terminal comprising the subscriber identity module (SIM) card holder and the master chip according to claim 2.

18. A mobile terminal comprising the subscriber identity module (SIM) card holder and the master chip according to claim 3.

19. A mobile terminal comprising the subscriber identity module (SIM) card holder and the master chip according to claim 4.

20. A mobile terminal comprising the subscriber identity module (SIM) card holder and the master chip according to claim 5.

21. A mobile terminal comprising the subscriber identity module (SIM) card holder and the master chip according to claim 6.

22. A mobile terminal comprising the subscriber identity module (SIM) card holder and the master chip according to claim 7.

23. A method of identifying hot-plug of a subscriber identity module (SIM) card, comprising:

monitoring, by a master chip of a mobile terminal, variation in voltage level of an additional metallic dome of a base of a SIM card holder, wherein the additional metallic dome is in an uncompressed state and in contact with high level when the SIM card is not plugged in the SIM card holder, and in a compressed state and in contact with low level when the SIM card is plugged in the SIM card holder, furthermore delivers its own high/low level to the master chip of the mobile terminal;

determining, by the master chip of the mobile terminal, that the SIM card is plugged in the SIM card holder when the additional metallic dome is converted from high level to low level; and determining, by the master chip of the mobile terminal, that the SIM card is pulled out from the SIM card holder when the additional metallic dome is converted from low level to high level.

* * * * *